UNITED STATES PATENT OFFICE.

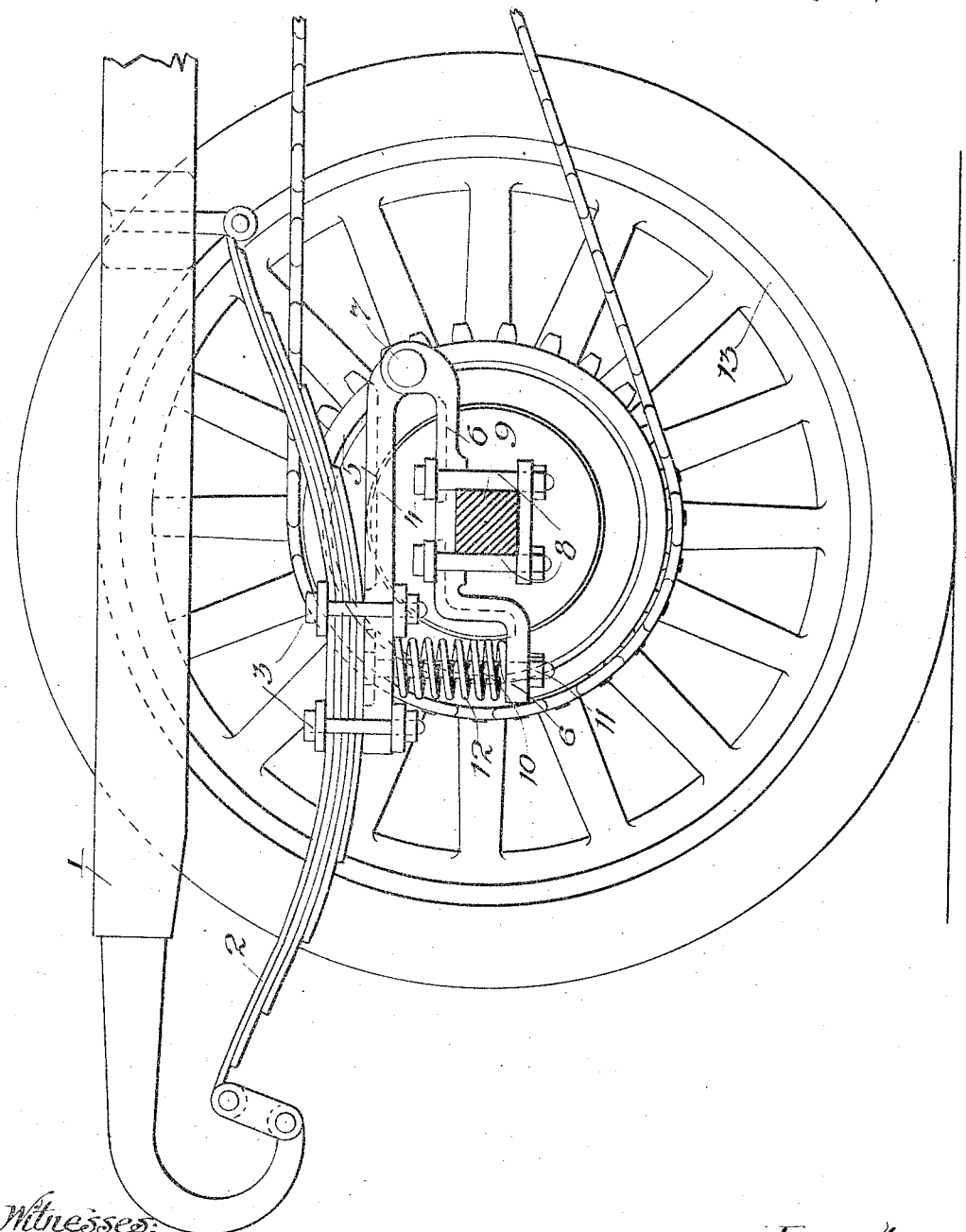

JOHN LEND, OF CHICAGO, ILLINOIS, ASSIGNOR TO MULTI MFG. CO., OF CHICAGO, ILLINOIS.

SHOCK-ABSORBER.

990,756.

Specification of Letters Patent.

Patented Apr. 25, 1911.

Application filed September 26, 1910. Serial No. 583,830.

*To all whom it may concern:*

Be it known that I, JOHN LEND, a citizen of the United States, residing at Chicago, in the county of Cook and State of Illinois, have invented certain new and useful Improvements in Shock-Absorbers, of which the following is a specification.

This invention relates to certain improvements in shock absorbers which are primarily adapted for use upon and in connection with motor driven and other vehicles; and its essential object is to produce a device having its various parts so constructed, combined, and arranged that when the vehicle, to which it is attached, is subjected to sudden shocks, jolts and jars, the device will effectually neutralize the shock of the opposing forces.

The invention consists in the features of construction and combination of parts hereinafter described and claimed.

In the drawing is shown a side elevation of this improved shock absorber applied or attached to a rear vehicle spring and wheel axle.

Referring to the drawing, to the vehicle or car frame 1 is attached, in any suitable manner, a vehicle spring 2 upon which is centrally mounted, by means of bolts or retainers 3, the upper outer end of a shock absorber frame 4, which is preferably formed of an upper section 5 and a lower section 6 hinged together at their inner meeting ends 7. The lower frame section 6 is fixedly secured, by means of bolts or retainers 8, about the end journal 9 of the vehicle axle, and the outer end of this section is bent down and outwardly, as shown, for the purpose of receiving and engaging an elongated post 10 which has its upper end secured to the upper frame section 5 and its lower end secured through the lower frame section 6, an adjustable nut 11 engaging its lower threaded end. This post 10 is encircled by a coiled or other spring 12 thus providing means for producing the desired amount of tension between the upper and lower shock absorber frame sections.

It will be noted that the hinged connection 7 prevents backward, forward, and side or lateral motion or movement of the device. Furthermore, the shock absorber is positioned so that its coiled spring lies centrally beneath the vehicle spring for the purpose of equally distributing and neutralizing the shocks, jars or jolts caused by the vehicle wheel 13 contacting rough or uneven surfaces.

In this construction no lubrication is required, and all of the parts of the device are constructed in a compact and durable manner and with a view to compensating for and producing a neutralizing effect when the vehicle is traveling over rough roads. The shock absorber frame is hinged at its inner ends and between its opposite outer ends is positioned the spring 12, thus providing a construction for dividing stress and strain at both ends of the device.

Without specifically limiting myself to the aforesaid construction, I claim:

1. In combination with a vehicle spring, a shock absorber comprising an upper section and a lower section hinged together at their inner meeting ends, the upper section being secured to the central portion of the vehicle spring, and the lower section being secured to a wheel axle, and an absorber spring positioned between and contacting both the upper and lower hinged sections, substantially in alinement with the central portion of the vehicle spring adjacent to the axle, substantially as described.

2. In combination with a vehicle spring, a shock absorber, comprising opposing complemental sections hinged together at their meeting ends, the outer end of the upper section being secured to the vehicle spring, and the lower section being secured to a wheel axle and its outer end being adjacent to the axle and in parallel alinement with the upper section, a post spaced between and secured to said upper section and relatively movable to the lower section, and a spring interposed between said upper and lower sections about said post, substantially as described.

3. In combination with a vehicle spring, a shock absorber, comprising opposing complemental sections hinged together at their meeting ends, the outer end of the upper section being secured to the vehicle spring, and the lower section being secured to a wheel axle and its outer end being adjacent to the axle and in parallel alinement with the upper section, a post spaced between and secured to said upper section and relatively movable to the lower section, and a spring interposed between said upper and lower sections about said post, the spring being positioned in substantial alinement with the central portion of the vehicle spring for equally distributing the vibrations thereto, substantially as described.

JOHN LEND.

Witnesses:
EPHRAIM BANNING,
WALKER BANNING.